United States Patent
Pasquali

(10) Patent No.: US 6,321,209 B1
(45) Date of Patent: Nov. 20, 2001

(54) SYSTEM AND METHOD FOR PROVIDING A DYNAMIC ADVERTISING CONTENT WINDOW WITHIN A WINDOW BASED CONTENT MANIFESTATION ENVIRONMENT PROVIDED IN A BROWSER

(75) Inventor: Sandro Pasquali, Santa Fe, NM (US)

(73) Assignee: Wired Solutions, LLC, Santa Fe, NM (US)

(*) Notice: Subject to any disclaimer, the term of this patent is extended or adjusted under 35 U.S.C. 154(b) by 0 days.

(21) Appl. No.: 09/252,076

(22) Filed: Feb. 18, 1999

(51) Int. Cl.$^7$ .................................................. G06F 17/60
(52) U.S. Cl. ................. 705/14; 705/26; 705/27; 705/80; 345/111
(58) Field of Search ................... 705/1, 14, 26, 705/27, 35, 77, 38, 80; 709/219, 206, 218; 707/3, 4, 10, 104, 102, 501, 203; 345/111, 112

(56) References Cited

U.S. PATENT DOCUMENTS

| | | | |
|---|---|---|---|
| 5,418,950 | 5/1995 | Li et al. ................................ | 395/600 |
| 5,913,215 | * 6/1999 | Rubinstein et al. .................... | 707/10 |
| 6,061,738 | * 5/2000 | Osaku et al. ........................... | 709/245 |
| 6,064,979 | * 5/2000 | Perowski ................................ | 705/26 |

FOREIGN PATENT DOCUMENTS

0822535 * 4/1998 (EP) .

OTHER PUBLICATIONS

"Advertise on @ Home" retrieved via the Internet and World–Wide Web at http://www.home.com/advertising/rate-card.html—Jun. 7, 1999, 4:40 PM.
"Advertise on @ Home" retrieved via the Internet and World–Wide Web at http://www.home.com/advertising/index.html—Jun. 7, 1999, 4:36 PM.
"Desktop.com" retrieved via the Internet and World–wide Web at http://www.desktop.com– Jul. 24, 2000, 4:24pm.

Richard Tedesco, Franchise chews up online scenery, pp. 1–2, Nov. 1997.*
Craig Stedman, CA's object database gets its sea legs, pp. 1–3, Dec. 1997.*
David Reich, Extending MFC drag–and–drop, pp. 1–5, Aug. 1998.*
Craig Menefee, PC Briefs, pp. 1–2, Jun. 1998.*
Anya Sacharow, A question of convergence, pp. 1–3, Apr. 1998.*
Susan Kuchinskas, Zap beams into classrooms, pp. 1–2, Oct. 1998.*
Burger Dale, sun hopes hotjava will become new Web standard, pp. 1–2, Nov. 1997.*

* cited by examiner

Primary Examiner—Eric W. Stamber
Assistant Examiner—Mussie Tesfamariam
(74) Attorney, Agent, or Firm—Erik B. Cherdak & Associates, LLC

(57) ABSTRACT

System and method for providing a dynamic advertising content manifestation window within a windows based content manifestation environment provided within a web browser. The system and method include and involve an server system configured to transmit a software system and data related to a advertising content source via an electronic data network. Also included and involved is a web browser client operating within a data processing system that is coupled to the server system via the electronic data network. The web browser provides a content manifestation environment. The web browser client is operative to receive the software system and the data via the server system, to process the software system and the data to produce a window object within the content manifestation environment provided by the web browser client. The window object is configured to dynamically manifest therein advertising content received from the advertising content source in accordance with the data. Also disclosed is a window object that is manifested within a windows based content manifestation environment which is provided within a web browser client. The window object includes a content manifestation area that is configured to dynamically manifest advertising content received from an advertising content source via an electronic data network.

18 Claims, 4 Drawing Sheets

SYSTEM AND METHOD FOR PROVIDING A DYNAMIC ADVERTISING CONTENT WINDOW WITHIN A WINDOW BASED CONTENT MANIFESTATION ENVIRONMENT PROVIDED IN A BROWSER

BACKGROUND OF THE INVENTION

1. Field of the Invention

The present invention relates to systems and methods that are used to distribute and manifest content such as advertising content received via the Internet and World Wide Web (WWW). More particularly, the present invention relates to the dynamic manifestation of advertising content within a window object maintained within a WWW browser environment.

2. Description of the Related Art

The Internet and the World Wide Web (WWW) have significantly impacted the way people receive information, purchase goods and services, and generally communicate. The Internet and WWW have facilitated whole content delivery industries that provide up-to-the-minute delivery (and sale) of information such as news, weather, sports scores, horoscopes, stock and securities information, advertising, etc. Many companies have recognized the great "gold-rush" nature of the Internet and have been quick to establish web-sites where people (a.k.a. "network surfers") can visit to purchase books online, to receive specialized content such as investment and other reports, and to subscribe to content delivery services such as "electronic" newspapers and magazines. Despite the widespread use and acceptance of the Internet and the WWW, many industry analysts and insiders insist that our society has only begun to realize the advantages of publicly accessible network technologies and predict that our lives will only be further impacted by increased uses of the "Net."

Many companies have been quick to adopt the Internet and WWW as fertile ground to sell goods and services to network users. For example, many companies place "banner advertisements" on web pages to entice network users to purchase related goods and services. In many cases, such banner ads are simple rectangular screen objects (e.g., one that has dimensions of 468 picture elements (pixelg) by 60 pixels as defined by the IAB banner ad standards) that contain text or graphics and, possibly, animated graphics that are loaded or pushed to a network user's web browser for loading and static display thereby. Additionally, JAVA based banner ads have been used to enhance advertising content. Once loaded, however, such advertising banners will appear on a network user's screen and, in particular, within a content manifestation environment maintained by a running WWW browser software package so long as the user remains on or at a particular web site. And, since banner ads are loaded as screen objects within a web site window, they remain static until either a now web site is loaded or a browser re-load/refresh operation occurs at the behest of the network user.

Banner ads often are associated with hypertext links that allow a network user to surf to an advertiser's or sponsor's web site to receive additional information about advertised goods and services. For example, many online brokerages houses (e.g., www.etrade.com) sponsor banner ads such as at YAHOO.COM's financial web site to entice network users and, especially, those interested in stocks, bonds, and securities to surf to a particular web site to become online securities traders (and customers). Despite their static nature, banner ads have proven to be quite effective at routing traffic to advertiser's web sites to promote the sale of goods and services online. In fact, banner ads as advertising and marketing tools have driven wide use and development of the Internet and WWW as a place for commerce. In fact, advertising via banner ads continues to be one of very few profitable ways to entice and engage in electronic commerce.

Despite their widespread use as tools to drive electronic commerce on the Internet and WWW, banner ads and other similar advertising and marketing mechanisms are not without their problems. For example, in addition to the fact that banner ads are statically displayed once loaded by a web browser, banner ads and other similar marketing tools do not allow different and dynamic marketing content to be displayed within a browser window. That is, a banner ad usually contains mere graphic image(s) (e.g., one that may contain animated graphics) which is associated with a single hypertext link ("hyperlink"). Such a banner ad cannot dynamically display content such as marketing and advertising content that is to be received via a network connection after an initial container web site page load.

Furthermore, in addition to the technical infirmities associated with modern banner ads, the same do not facilitate dynamic, rich advertising that network users have become used to in other media forums and which can deliver the most "bang for the buck" in terms of providing the highest possible sales return related to a particular marketing and promotion investment. For example, current banner ads do not come close to the richness of television or radio advertisements that allow full motion video, audio, etc. Accordingly, although network bandwidth capabilities to not currently allow the push of content like television ads, that same bandwidth is not being effectively deployed to facilitate richer, more effective network advertising.

Thus, there exists a need to provide new and improved systems and methods to facilitate dynamic display of advertising and marketing content. Such systems and methods must allow effective and efficient deployment of advertising banners and corresponding content streams without requiring Internet and WWW infrastructures and standards to change. And, to be viable, network users must be able to receive new and improved advertising and marketing content that facilitate greater sales in relation to spent advertising dollars.

SUMMARY OF THE INVENTION

The present invention solves the above-described problems associated with providing advertising and marketing content to network users. In particular, the present invention provides new systems, structures, and related methods that facilitate the generation of window modules that are dedicated to facilitating dynamic display of advertising and marketing content. Such new and improved systems and methods now allow network users to receive richer advertising content in contrast to currently available static banner ads. Such richer advertising content will allow advertisers to more effectively compete to sell more goods and services. And, since richer advertising content now may be manifested, a greater number of advertisers will be able to view the Internet and WWW as viable areas for marketing and commerce. And, since the present invention does not require changes to existing network architectures and will be readily applicable to new technologies to come, network users and advertisers alike will benefit from richer content manifestation.

Accordingly, provided is a system and method for providing a dynamic advertising content window within a windows based content manifestation environment provided within a web browsor. The system and method include and involve a server system configured to transmit a software system and data related to a advertising content source via an electronic data network. Also included and involved is a web browser client operating within a data processing system that is coupled to the server system via the electronic data network. The web browser provides a content manifestation environment. The web browser client is operative to receive the software system and the data via the server system, to process the software system and the data to produce a window object within the content manifestation environment provided by the web browser client. The window object is configured to dynamically manifest therein advertising content received from the advertising content source in accordance with the data. The advertising content source may be the server system.

According to another aspect of the present invention, provided is a window object that is manifested within a windows based content manifestation environment which is provided within a web browser client. The window object includes a content manifestation area that is configured to dynamically manifest advertising content received from an advertising content source via an electronic data network.

BRIEF DESCRIPTION OF THE DRAWINGS

The present invention is described in detail below with reference to the following drawing figures, of which.

DETAILED DESCRIPTION OF THE PREFERRED EMBODIMENTS

Figure 1:
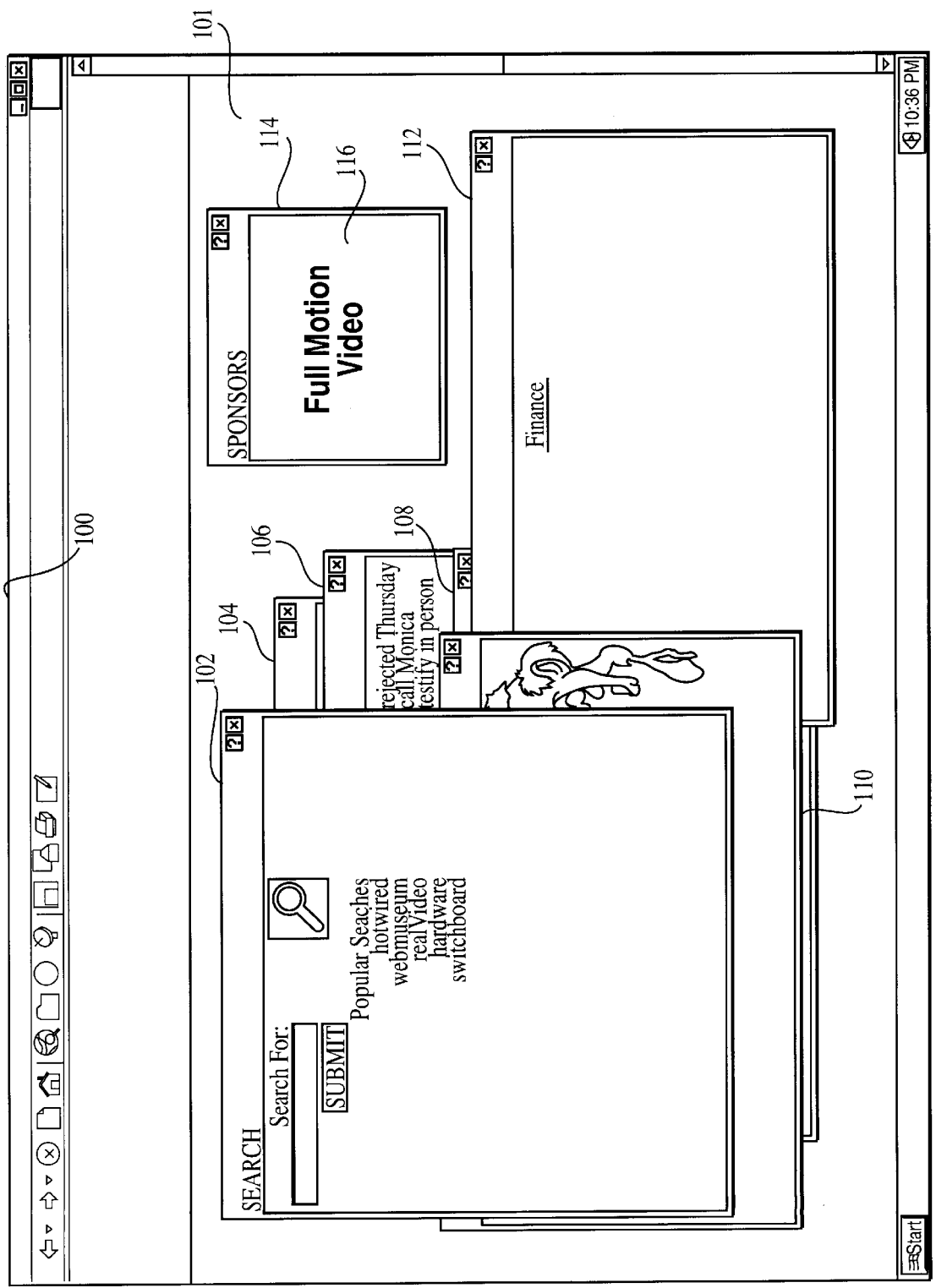
FIG. 1 is a screen image that depicts structural aspects of the present invention and, in particular, a window module configured to dynamically manifest advertising and marketing content therein within a windows based content manifestation environment provided in accordance with a preferred embodiment of the present invention.

The present invention is now discussed in detail with reference to the drawing figures that were briefly described above. Unless otherwise specified, like parts, systems, and processes are referred to with like reference numerals.

Glossary

The following terms may be used within the instant patent document to illustrate and define the novel features of the present invention. Accordingly, reference should be had to this Glossary for definitions of terms that are used to provide enabling disclosure related to the present invention's systems and methods for facilitating a windows based content manifestation environment within a WWW browser and a dedicated advertising content window module therein.

The terms that are capitalized below bear the following meanings.

Content is any form of digital data stream that may be supplied or sent to a computing system such as a personal computer. In the context of the present invention, content includes advertising information that may take the form of a data stream of video, audio, etc. Any media format that may be used to deliver active, dynamic content to a computer screen and other peripheral devices (e.g., sound systems, etc.) may be considered content in the context of the present invention.

The WWW is the world wide web and its associated protocols and related technologies which may be accessed via the Internet.

A WWW browser client is a software application that is operative to receive and process content to produce a corresponding output (e.g., to manifest text and images within a browser window displayed on a monitor device, etc.).

An Electronic Data Network is any type of network environment from which at least one coupled computer or computing system is configured to receive content such as HTML and related WWW content and to process the same to produce an appropriate output. An exemplary electronic data network is the Internet along with the WWW.

A window object is a Module or a Layer.

A Layer is a WWW browser content display section produced within a content manifestation environment (CME) including, but not limited to, any object within an HTML document that may be scaled, dragged, or otherwise operated upon such as an IMG object, a SPAN object, A DIV object, a form element, etc. and which may be associated with program logic such as within a script, etc. A layer has its own properties including, but not limited to, a name, etc. within an HTML rendition model such as those defined by DHTML standards. Additionally, a layer acts independently of other content within a particular HTML document.

A CME is a controllable WWW browser content display window provided by a WWW browser. For example, a CME is viewed as a dynamic window in which WWW content is normally displayed.

A Module (also referred to herein as a Window Module) is a layer having (1) a control section, and (2) a related content display section which may be manifested within a CME. A module may be recursively referenced in that a particular module provided in accordance with the present invention may include other modules. In other words, the present invention makes it possible to have window objects within window objects. The control section of a module may contain a name associated with the module, one or more module sizing icons, etc.

A DMOD is a draggable module much like a draggable type window provided within an operating system environment.

A TMOD is a tiled module much like a tiled type window provided within an operating system environment.

A Fixed Screen Region or FSR is an area of a screen environment such as within a CME in which content may flow based on Module operation 1, Java applet control, etc.

A Fixed Layer or FL is a layer having the same behavior as a FSR.

A Content Manifestation Layer or CML is a pop-up type layer much like a pop-up dialog box that can manifest content based on operations occurring within a Module (egg., hyper-link traversal and/or occurrence of another event, etc.).

Module Controls or MCs control objects such as objects associated with screen icons that react to events (e.g., mouse clicks, mouse-overs, double-clicks, etc,) and which control attributes of a module (e.g., minimization, maximization, closure, resizing, etc.). The icons associated with such control objects will appear in a control section of a module.

The terms "dynamic manifestation" and "dynamic display" refer to the rendition of content such as advertising and marketing content received via an electronic data network such as the Internet and WWW within a window module provided in accordance with the present invention. For example, dynamic manifestation includes the display of a full motion video stream received from an ad content source (VRL) within a window module in accordance with the present invention.

The aforementioned and defined terms may be made plural in the text found below (e.g., "DMODs"). Such terms may only be referred to in documentation incorporated by reference herein.

A Windows Based Content Manifestation Environment (CME)

The present invention utilizes technology which has been described and disclosed in co-pending U.S. patent application Ser. No. 09/234,297 filed in the U.S. Patent and Trademark Office on Jan. 21, 1999, which is hereby incorporated by reference.

Structural Aspects of the Present Invention

Referring now to FIG. 1, depicted therein is a screen image that illustrates structural aspects of the present invention and, in particular, a window module configured to dynamically manifest advertising and marketing content therein within a windows based content manifestation environment provided in accordance with a preferred embodiment of the present invention.

In particular, screen image 100 depicts a WWW browser client CME 101 that has been instructed in accordance with the present invention to manifest a windows based environment in which content may displayed or otherwise manifested in window modules provided in accordance with the present invention. Such window modules may be generated and manipulated in accordance with the structural and functional aspects defined in the above referenced co-pending U.S. patent application.

In CME 101, a series of window modules 102, 104, 106, 108, 110, and 112 in the form of DMODs have been provided to facilitate manifestation of content such as news, email, chat, search, etc. The creation of such window modules will be readily apparent after reviewing the above-referenced co-pending U.S. patent application.

In CME 101, a special window module 114 has been provided in the form of a DMOD to facilitate dynamic manifestation of advertising and marketing content that may be received by a WWW browser client (running on a personal data processing system, for example) via a network connection, etc. Window module 114 has been defined to have a control section that includes a title (e.g., "SPONSORS") and a set of control icons. Such structural aspects along with their corresponding operational features related to window module 114 are fully described in the above-referenced co-pending U.S. patent application.

The content that may be manifested within window module 114 may include any type of content including live video streams, audio feeds, etc. Such content is manifested, for example, in a manifestation area 116 of window module 114.

Unlike banner advertisements, window module 114 may be used to manifest advertising and marketing content in a dynamic way and, possibly, from a variety of advertising content sources each having an associated uniform resource locator (URL). Accordingly, so long as a network user remains at a particular web site (e.g., one that provides for a windows based content manifestation environment—WWW.WINDOWSWEBSITE.COM) and/or just a dynamic ad window in accordance with the present invention, a dynamic advertising content window may be displayed to manifest advertising content such as from a variety of advertisers and sponsors, etc.

As the present invention now provides a dynamic web based advertising vehicle that is different from the use of conventional banner advertisements, a whole new way of generating advertising revenue is realized. That is, in contrast to conventional banner advertisement revenue paradigms that call for cost per impression pricing, the present invention and its provision of a dynamic advertising content window now allow for the generation of advertising revenue according to paradigms used for television and other media forums. For example, advertisers who would normally pay for banner advertisement impressions may now place ads that are rich in content and that exist for periods of time much like television commercials and the like. Accordingly, advertising and marketing firms may now derive advertising revenue for "air time" of particular dynamic content advertisements.

Figure 2:
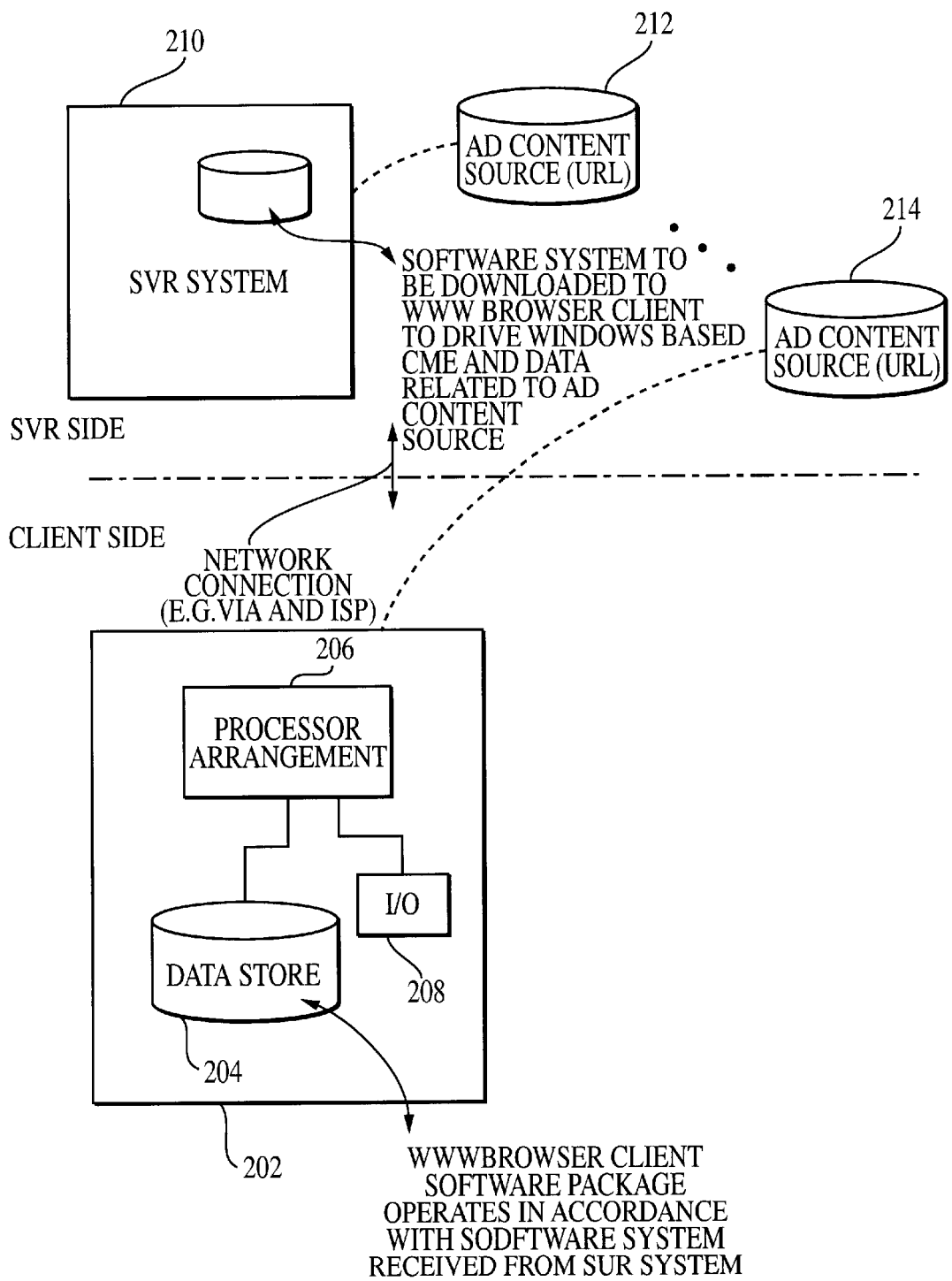
FIG. 2 is a block diagram of a computing environment in which a client computing system is coupled to a server system and which is configured to run a WWW browser client which manifests a window module that can dynamically manifest advertising and marketing content in accordance with a preferred embodiment of the present invention.

Referring now to FIG. 2, depicted therein is a is a block diagram of a computing environment in which a client computing system is coupled to a server system and which is configured to run a WWW browser client that manifests a window module that can dynamically manifest advertising and marketing content in accordance with a preferred embodiment of the present invention.

In environment 200, a client computing system such as a personal data processing system or computer 202 is coupled to a server system 210 via an electronic data network such as the Internet and WWW, an intranet or other network computing environment. The dashed line separating client data processing system 202 and server system 210 is intended to merely illustrate the transmission of data from a server type data processing system and the receipt of that data by a client type data processing system.

Server data processing system 210 is coupled directly or indirectly (e.g., via a network connection) to advertising and marketing content sources 212 through 214. Such sources may be computing platforms and networks that serve advertising content upon request for the same from a WWW browser client in accordance with the present invention. For example, an ad content source like or similar to ad content source 212 may serve a video stream that will appear as a full motion video and audio commercial (e.g., much like a television commercial) within an advertising content window provided within a WWM browser CME in accordance with the present invention.

Client data processing system 202 includes a data storage facility 204, a processor arrangement having one or more processing units, and input/output facilities to facilitate network communications such as TCP/IP protocol based communications (e.g., a modem, a network interface card, etc.). Input/ouput facilities 208 also include content manifestation peripherals including, but not limited to, a monitor for visual display, a set of speakers for audible manifestation, a printer for hard-copy output, etc. The structural arrangement of the component parts of client data processing system 202 will be immediately understood by those skilled in the art of computer design.

Data storage facility 204 (e.g., local hard disk drives, etc.) store a network client and/or WWW browser client software package/application that may be executed within client data processing system. Such a network client/WWW browser client software package/application may be the INTERNET EXPLORER™ version 4.x which is manufactured and marketed by MICROSOFT CORPORATION. Such a network client/WWW browser client software package/application will be instructed in accordance with a software system received from server system 210 to facilitate a windows based content manifestation environment within a WWW browser type content manifestation environment window. Additionally, such a network clien/WWW browser client software package/application will receive data related to at least one advertising and marketing content source from sever data processing system 210 (e.g., at least one URL which points to ad content sources such as ad content sources 212 through 214). Alternatively, such data received from SUR system 210 may include ad content.

Operational Aspects of the Present Invention

Figure 3A:
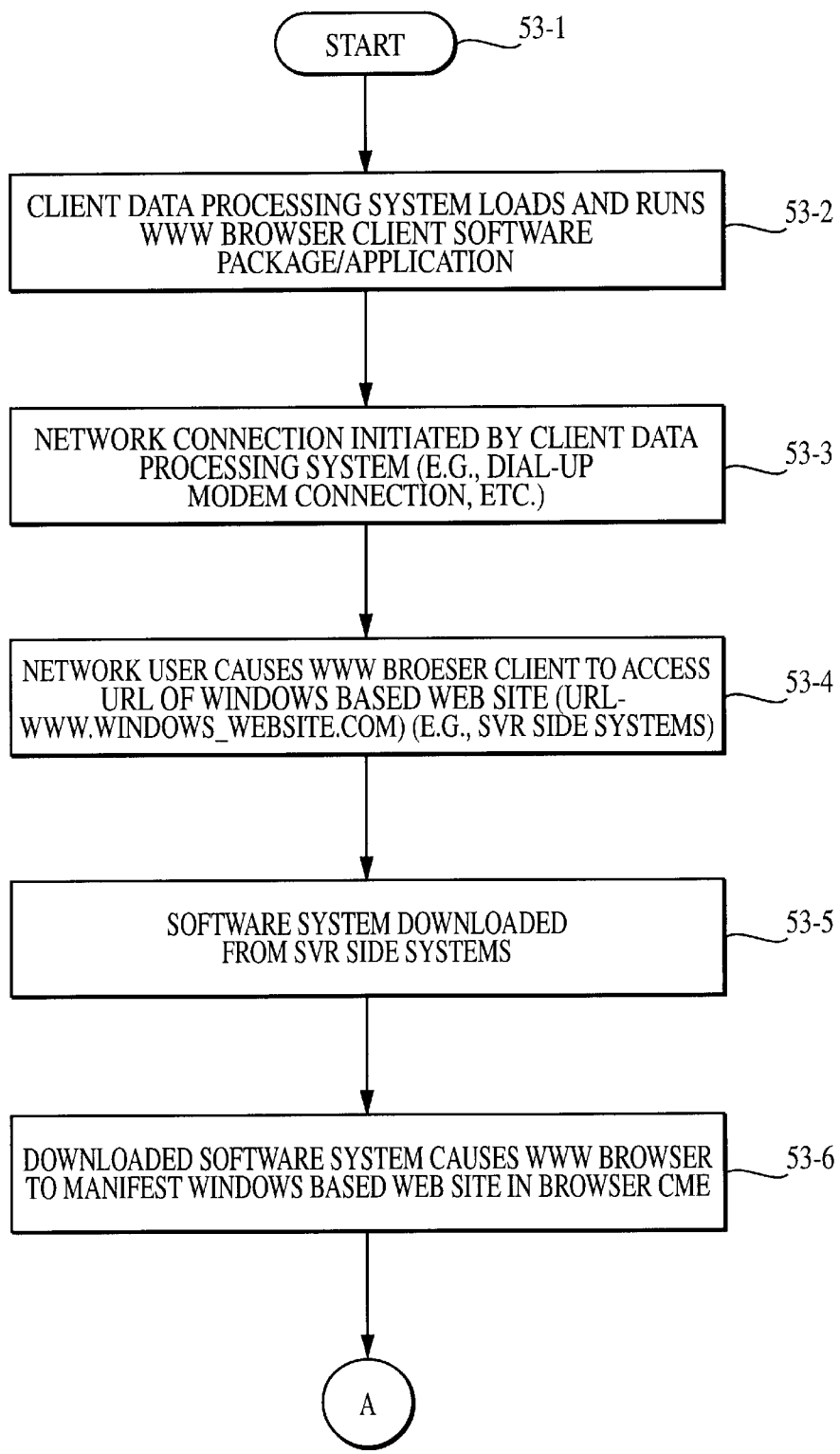
FIG. 3A is a flowchart that illustrates a process for generating an advertising window module and for dynamically manifesting advertising and marketing content therein in accordance with a preferred embodiment of the present invention.
Figure 3B:
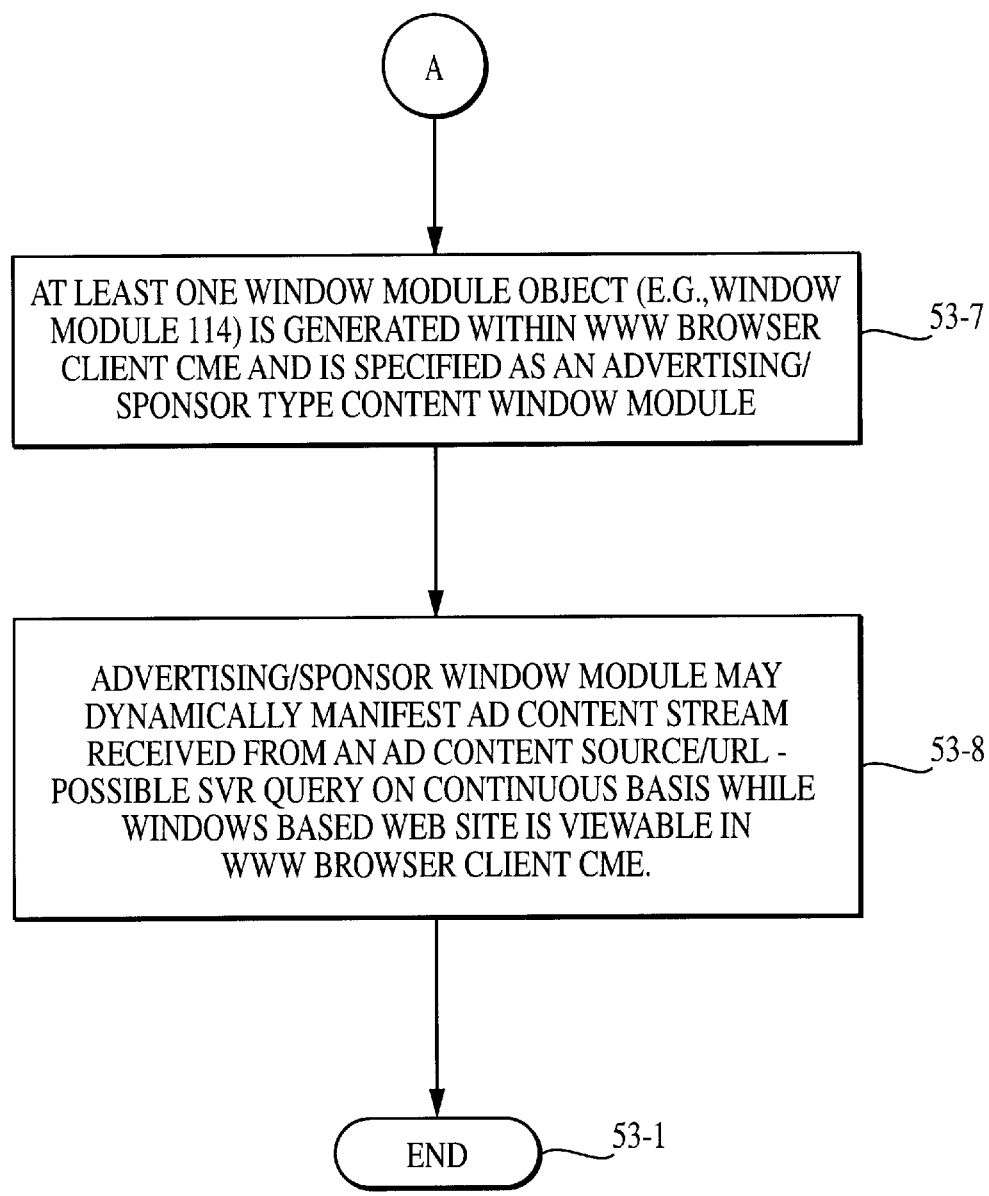
FIG. 3B is the conclusion of the flowchart started in FIG. 3A.

Referring now to FIGS. 3A and 3B, depicted therein is a flowchart that illustrates a process for generating an advertising window module within a WW browser and for dynamically manifesting advertising and marketing content therein in accordance with a preferred embodiment of the present invention.

In particular, processing and operation gtgrt at stop S3-1 and immediately proceed to step S3-2. At step S3-2 a client data processing system loads and runs a WWW browser client software package/application or other network client.

Next, at step S3-3, a network connection is initiated by the client data processing system (e.g., a dial-up networking connection via a modem, etc.).

Next, at step S3-4, a network user causes the running WWW browser or other network client to access a URL or a windows based web site (e.g., URL—www.windows website.com and one that points to server side systems).

Next, at step S3-5, a software system is downloaded from server side systems to the client data processing system. Such a software system facilitates a windows based GME within a WWW browser and is discussed in detail in co-pending U.S. patent application 09/xxx,xxxx which has been incorporated herein by reference.

Next, at step S3-6, the downloaded software system causes the WWW browser client to manifest a windows based web site in a browser CME.

Processing and operations proceed at the top of FIG. 3B to which reference is now made.

At step S3-7, at least one window module object (e.g., window module 114) is generated within a WWW browser client CME and is specified as an advertising, marketing, and sponsor type window module in which advertising content may be dynamically manifested in accordance with the present invention.

Next, at step S3-8, the ad/sponsor window module may dynamically manifest an ad content stream received from an ad content source. And, there may be subsequent server queries on a continuous basis, for example, to facilitate the manifestation of different and multiple commercials from various sponsors while a windows based website is viewable in the WWW browser CME.

Processing and operations end at step S3-9.

It should be noted that although a singular advertising content window has been shown and described relative to a WWW browser CME, the present invention is not so limited. To the contrary any number of ad window modules may be deployed to dynamically manifest advertising content.

Furthermore, although the present invention certainly contemplates generation of one or more advertising content window modules within a windows based CME of a WWW browser client, the present invention is not so limited. In fact, the present invention also contemplates the use of the disclosed technologies on conventional type web sites to offer any number of windows-like dynamic advertising content manifestation. Such technologies will now allow web site providers to offer richer content manifestation environments.

The present invention now provides a new way of generating online based advertising revenue. That is, in addition to simple banner ad impression revenue, advertisers and advertising entities may now charge for advertising content display much like the way television ads are charged. In particular, advertisers and advertising entities may now charge for timed "spots" such as thirty second ads during certain time periods (e.g., a thirty second spot during a peak network use period when most relevant consumers are visiting a particular web site, etc.).

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A system for providing a dynamic advertising content window within a windows based content manifestation environment provided within a web browser, comprising:

a server system configured to transmit a software system and data related to a advertising content source via an electronic data network; and a web browser client operating within a data processing system that is coupled to said server system via the electronic data network and having a content manifestation environment, said web browser client operative to receive said software system and said data via said server system, to process said software system and said data to produce a movable window object within said content manifestation environment of said web browser client, said movable window object configured to dynamically manifest therein advertising content received from said advertising content source in accordance with said data.

2. The system according to claim 1, wherein said software system includes instructions related to the size and placement of said window object within said content manifestation environment.

3. The system according to claim 1, wherein said advertising content source includes full motion video content.

4. The system according to claim 1, wherein said advertising content source includes an audio feed.

5. The system according to claim 1, wherein said electronic data network is the Internet and WWW.

6. The system according to claim 1, wherein said web browser client accesses said advertising content source to receive advertising content to be dynamically manifested within said window object.

7. The system according to claim 6, wherein said web browser client accesses said advertising content source more than one time to receive corresponding different content to be dynamically manifested within said window object.

8. The system according to claim 1, wherein said software system further includes instructions to be processed by said web browser client to generate additional window objects related to other content streams, said window object being viewable within said content manifestation environment regardless of any manifestation of said other content streams within said additional window objects.

9. A method for providing a dynamic advertising content window within a windows based content manifestation environment provided within a web browser, comprising the following steps:

from a server system, transmitting a software system and data related to an advertising content source via an electronic data network;

at a web browser client operating within a data processing system that is coupled to said server system via the electronic data network, receiving said software system;

processing said software system and said data to produce a movable window object within a content manifestation environment provided by said web browser; and dynamically manifesting said advertising content within said movable window object in accordance with said data.

10. The method according to claim 9, wherein said software system includes instructions related to the size and placement of said window object within said content manifestation environment.

11. The method according to claim 9, wherein said data relates to a full motion video content source.

12. The method according to claim 9, wherein said data relates to an audio feed.

13. The method according to claim 9, wherein said electronic data network is the Internet and WWW.

14. The method according to claim 9, wherein said web browser client accesses said advertising content source in accordance with said data to receive advertising content to be dynamically manifested within said window object.

15. The method according to claim 14, wherein said web browser client accesses said advertising content source in accordance with gnid data more than one time to receive corresponding different content to be dynamically manifested within said window object.

16. The method according to claim 9, wherein said software system further includes instructions to be processged by said web browser client to generate additional window objects related to other content streams, said window object being viewable within said content manifestation environment regardless of any manifestation of said other content streams within said additional window objects.

17. The method according to claim 9, wherein said data includes at least one uniform resource locator (URL) corresponding to said advertising content source.

18. A system for providing a dynamic adyrnsing content window within a windows based content manifestation environment provided within a web browser, comprising:

a server system configured to transmit a sofware system and data related to an advertising content source via an electronic data network; and a web browser client operating within a data processing system that is coupled to said server system via the electronic data network and having a content manifestation environment, said web browser client operative to receive said software system and said data via said server system, to process said software system and said data to produce a window object solely contained within said content maniestation environment of said web browser client, said window object configured to dynamically manifest therein advertising content received from said advertising content source in accordance with said data, wherein the window object is moveable and draggable within said content manifestation environment of said web browser client, and is under direct control of said web browser client.

* * * * *